US012732071B2

(12) United States Patent
Simonin et al.

(10) Patent No.: US 12,732,071 B2
(45) Date of Patent: Sep. 8, 2026

(54) GROUNDING BRUSH ASSEMBLY

(71) Applicant: AKTIEBOLAGET SKF, Gothenburg (SE)

(72) Inventors: Anthony Simonin, Tours (FR); Emmanuel Benevise, Monts (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 268 days.

(21) Appl. No.: 18/742,510

(22) Filed: Jun. 13, 2024

(65) Prior Publication Data

US 2025/0007367 A1 Jan. 2, 2025

(30) Foreign Application Priority Data

Jun. 30, 2023 (FR) ...................................... 2306924

(51) Int. Cl.
*H02K 13/10* (2006.01)
*H02K 11/40* (2016.01)

(52) U.S. Cl.
CPC ............. *H02K 13/10* (2013.01); *H02K 11/40* (2016.01)

(58) Field of Classification Search
CPC .......... H02K 13/10; H02K 11/40; H02K 5/14; H02K 13/00; H02K 5/145; H02K 5/15; H01R 39/24; H01R 2201/10; H01R 4/64; H01R 39/38; H01R 39/64; H01R 39/385; H01R 39/39
See application file for complete search history.

(56) References Cited

U.S. PATENT DOCUMENTS

2011/0216466 A1 9/2011 Oh et al.
2019/0296617 A1* 9/2019 Hubert .................. H01R 39/64
2021/0021180 A1 1/2021 Hubert et al.
2021/0310520 A1* 10/2021 Arnault ................ F16C 35/077

FOREIGN PATENT DOCUMENTS

DE 102019133884 A1 6/2021
JP 2015095440 A 5/2015
KR 102474503 B1 12/2022

OTHER PUBLICATIONS

Preliminary Search Report from the French Patent Office dated Jan. 18, 2024 in related French application No. FR2306924, including Search Report and Written Opinion.

* cited by examiner

*Primary Examiner* — Thomas Truong
(74) *Attorney, Agent, or Firm* — J-TEK LAW PLLC; Scott T. Wakeman; Mark A. Ussai

(57) ABSTRACT

A grounding brush assembly includes a brush and a mounting plate, the brush including a support and conductive fibers disposed within the support. The support includes a mounting portion, first and second lateral rims extending from the mounting portion and axially gripping the fibers, and at least one retention portion extending the first lateral rim. The retention portion includes a mounting part extending in a bore of the mounting plate and at least one retention hook extending radially outwardly from the mounting part and interacting with the mounting plate. The at least one retention hook is located axially on a side of the mounting plate opposite to the first lateral rim.

8 Claims, 3 Drawing Sheets

GROUNDING BRUSH ASSEMBLY

CROSS-REFERENCE

This application claims priority to French patent application no. 2306924 filed on Jun. 30, 2023, the contents of which are fully incorporated herein by reference.

BACKGROUND OF THE INVENTION

The present invention relates to the field of grounding devices for controlling the shaft voltage generated in electric motors or machines, and in particular grounding brush assemblies.

In an electric motor or machine, at least one rolling bearing is mounted between the casing of the electric motor or machine and the rotary shaft in order to support the shaft.

In operation when the shaft is rotating, there may be a difference in electrical potential between the shaft and the casing of the electric motor or machine, which generates an electric current between the inner ring of the rolling bearing, rigidly secured to the shaft, and the outer ring of the rolling bearing, which is rigidly secured to the casing.

Electrical current passing through the components of the rolling bearing can damage these components, in particular the rolling elements and the raceways formed on the inner and outer rings. Electrical discharges can also generate vibration.

To overcome these drawbacks, it is known practice to ground or earth the rotary shaft using a grounding brush comprising conductive fibers. The grounding brush is usually mounted in the bore of the casing of the electric motor such that the free ends of the fibers are in radial contact with the outer surface of the rotary shaft.

Due to the conductivity of the fibers, the brush is maintained at the same electrical potential as the casing of the electric motor. The inner and outer rings of the rolling bearing are also at the same electrical potential, which reduces or even eliminates problematic electrical discharges through the rolling bearing.

US Patent Publication No. 2021/0021180 A1 discloses a grounding brush assembly comprising a grounding brush provided with a support and a plurality of conductive fibers mounted in this support and an annular mounting plate. The mounting plate is provided with a plurality of tabs for radial and axial retention of the support of the grounding brush and an annular outer flange radially surrounding the brush and the tabs. The tabs are formed by plastic deformation of the mounting plate.

SUMMARY OF THE INVENTION

The present invention aims to provide an alternative mechanism or structure for attaching a grounding brush to a mounting plate.

The present invention relates to a grounding brush assembly comprising a grounding brush and a brush mounting plate, the brush being provided with a plurality of conductive fibers and with a support inside which the conductive fibers are housed.

The support comprises a mounting portion, a first lateral rim extending the mounting portion on one side, and a second lateral rim extending the mounting portion on the other side, the first and second lateral rims axially gripping the conductive fibers.

According to a general feature of the invention, the support of the brush further comprises at least one retention portion extending the first lateral rim and provided with a mounting part extending in the bore of the mounting plate and with at least one retention hook extending the mounting part radially outwardly and interacting with the mounting plate so as to axially retain the support of the brush with respect to the mounting plate, the hook being located axially on the side opposite the first lateral rim with respect to the mounting plate.

Thus, the brush and the mounting plate are rigidly secured together axially, simply and inexpensively by virtue of the hook or hooks of the support of the brush.

The mounting plate may be provided with a main body.

The main body of the mounting plate may be annular.

The mounting plate may comprise at least one centering portion extending the main body of the mounting plate at least axially, which is offset radially outwards with respect to the support and has an outer surface defining the outside diameter of the mounting plate.

The mounting part of the retention portion may extend in the bore of the main body of the mounting plate.

The hook of the retention portion may be able to interact with the main body of the mounting plate.

The hook of the retention portion may be located axially on the side opposite the first lateral rim with respect to the main body of the mounting plate.

The retention portion of the support of the brush may extend from a small-diameter edge of the first lateral rim of the support of the brush.

The hook of the retention portion may interact by axial contact with the mounting plate so as to axially retain the support of the brush with respect to the mounting plate.

The hook of the retention portion may interact by axial contact with the main body of the mounting plate so as to axially retain the support of the brush with respect to the mounting plate.

The hook of the retention portion may be in axial contact with the mounting plate.

The first lateral rim of the support of the brush may be in axial contact with the mounting plate.

According to a particular design, the support of the brush comprises a single retention portion having a mounting part extending over an angular sector of greater than 300°, in particular greater than 350°, and at least one retention hook.

According to another design, the support of the brush comprises at least two retention portions, each retention portion comprising a mounting part extending over a limited angular sector and at least one retention hook.

The present invention also relates to an electric motor comprising a casing, a shaft and a grounding brush assembly as defined above and mounted radially between the casing and the shaft, the conductive fibers of the assembly being in contact with the shaft, the mounting plate being in radial contact with the bore of the casing.

BRIEF DESCRIPTION OF THE SEVERAL VIEWS OF THE DRAWINGS

The present invention will be understood more clearly on reading the detailed description of embodiments, provided by way of non-limiting examples and illustrated by the attached drawings in which.

DETAILED DESCRIPTION OF THE INVENTION

Figure 1:
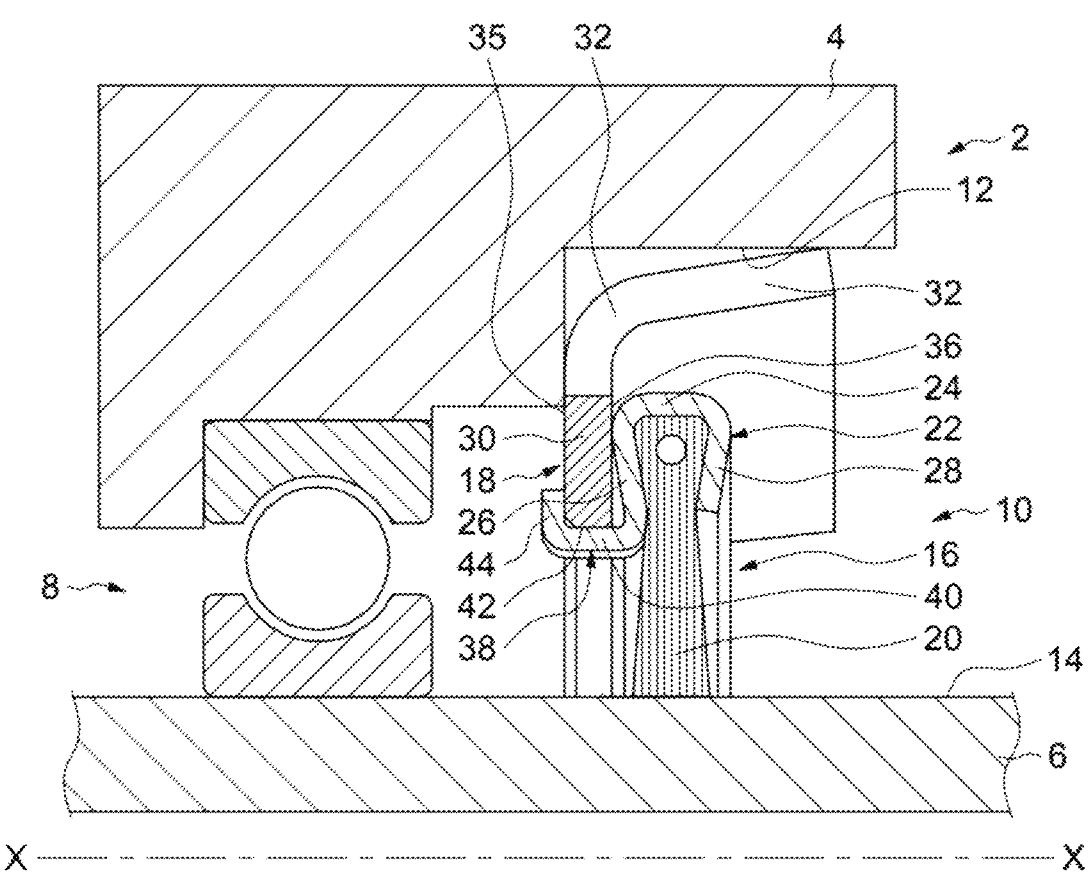
FIG. 1 is an axial cross sectional view of a grounding brush assembly mounted radially between a rotary shaft and a casing of an electric motor according to an exemplary embodiment of the invention.

FIG. 1 shows, in axial cross section, part of an electric motor or machine 2 comprising a fixed casing 4, a shaft 6, specifically a shaft 6 rotatable about a central axis X-X, supported radially by a bearing 8. The bearing 8 is for example a rolling bearing such as a ball bearing. Alternatively, the bearing 8 may include any other types of rolling elements, for example cylindrical rollers, tapered rollers, needles, etc., or may even be a plain bearing.

The motor 2 comprises a grounding brush assembly 10 mounted radially between the bore 12 of the casing 4 and the cylindrical outer surface of the shaft 14. The assembly 10 is, for example, force-fitted in the bore 12 of the casing 4.

Figure 2:
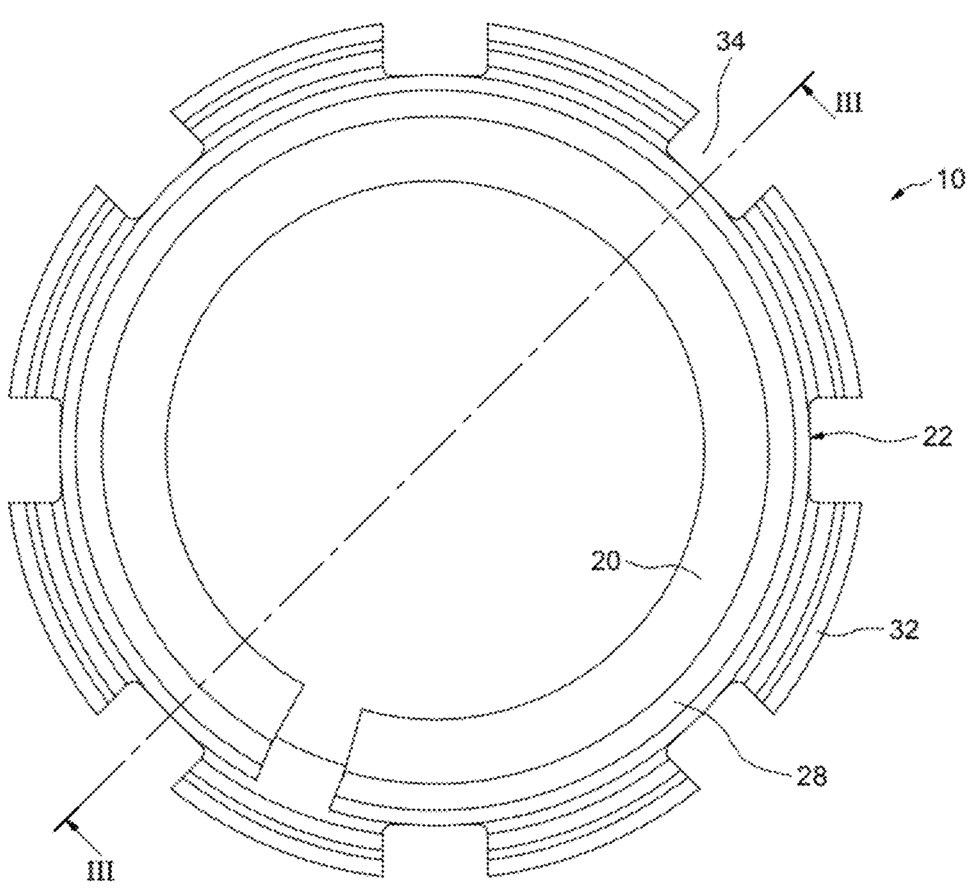
FIG. 2 is an end-on view of the grounding brush assembly of FIG. 1.
Figure 3:
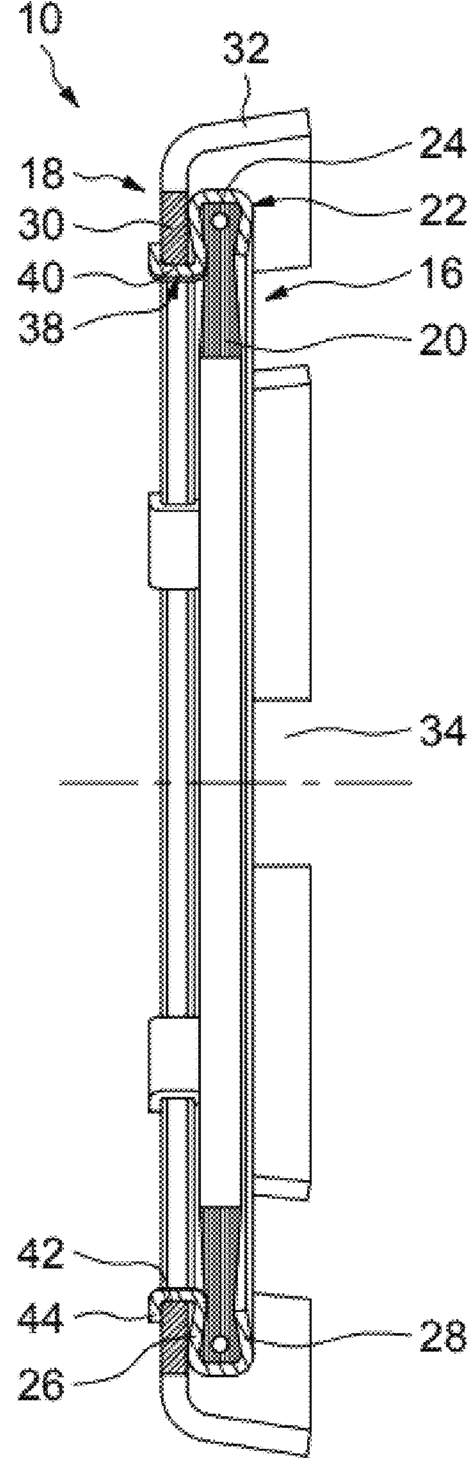
FIG. 3 is a view in cross section of the assembly of FIG. 2 along the axis III-III.

As shown more clearly in FIGS. 2 and 3, the assembly 10 has a generally annular shape. The assembly 10 basically comprises a grounding brush 16 and a brush mounting plate 18. The brush 16 includes a plurality of conductive fibers 20 and a support 22, the conductive fibers 20 being housed inside the support 22 of the brush 16. The conductive fibers 20 are made of any appropriate material, for example, carbon, stainless steel, a conductive plastic such as acrylic or nylon fibers, etc. The plurality of conductive fibers 20 preferably take the form of an open ring. In the example shown, the conductive fibers 20 are bent around a connecting wire. The free distal end of each conductive fiber 20 is in radial contact with the cylindrical outer surface of the shaft 14.

To ensure the mounting and retention of the conductive fibers 20, the support 22 of the brush 16 includes a mounting portion 24, a first lateral rim 26 extending from one axial side of the mounting portion 24 and a second lateral rim 28 extending from an opposing axial side of the mounting portion 24. The mounting portion 24 extends axially from a large-diameter edge of the first lateral rim 26 and the first lateral rim 26 extends radially inwardly from the mounting portion 24.

Similarly, the mounting portion 24 extends axially from the large-diameter edge of the second lateral rim 28 and the second lateral rim 28 extends radially inwardly from the mounting portion 24. The second lateral rim 28 extends from the mounting portion 24 on the side opposite to the first lateral rim 26.

In the depicted embodiments, the mounting portion 24 extends substantially axially, but alternatively, the mounting portion 24 extends generally angled or obliquely.

The mounting portion 24 and the first and second lateral rims 26, 28 are of generally annular shape and delimit a channel (not indicated) that is open radially inwardly, inside of which is located or disposed a radially outer end of each of the conductive fibers 20. The first and second lateral rims 26, 28 axially grip the conductive fibers 20 and the conductive fibers 20 bear axially on either side against the first and second lateral rims 26, 28.

In the depicted exemplary embodiment, the conductive fibers 20 come to bear radially against the mounting portion 24, the first and second lateral rims 26, 28 extending obliquely inwardly from the mounting portion 24. In a variant, the first and second lateral rims 26, 28 could extend substantially radially.

As will be described in more detail below, the support 22 of the brush 16 further includes a plurality of retention hooks 44 for rigidly securing the support 2 axially with respect to the mounting plate 18. The mounting plate 18 includes an annular main body 30 bearing axially against the first lateral rim 26 of the support 22 of the brush 16 and a plurality of centering portions 32 extending obliquely outwardly from the large-diameter edge of the main body 30.

The centering portions 32 of the mounting plate 18 are circumferentially spaced apart, i.e., spaced apart from each other in the circumferential direction of the assembly 10, with a notch 34 being defined circumferentially between each two consecutive centering portions 32. The centering portions 32 may be formed, for example, by cutting or piercing an annular portion in such a manner as to form the notches 34 (e.g., in a stamping operation).

The centering portions 32 define the outside diameter of the mounting plate 18, more specifically, the outer surfaces of the centering portions 32 define the outside diameter of the mounting plate 18. The centering portions 32 enable centering of the mounting plate 18 after mounting in the bore 12 of the casing 4 of the associated electric motor 2. Preferably, each centering portion 32 extends obliquely outwardly, at least locally surrounding the mounting portion 24 of the brush 16 and being spaced radially at a distance from the mounting portion 24 and the support 22 of the brush 16. Alternatively, each centering portion 32 may extend entirely axially and/or may extend in a direction axially opposite to the support 22 of the brush 16.

Preferably, the mounting plate 18 and the support 22 of the brush 16 are two separate parts or components that are connected together. The mounting plate 18 and the grounding brush 16 are each formed of an electrically conductive material, for example aluminum, stainless steel, bronze, copper or another material.

The main body 30 of the mounting plate 18 includes two opposite end faces 35, 36 which delimit the axial thickness of the main body 30. The first lateral rim 26 of the support 22 of the brush 16 bears axially against the end face 36 of the main body 30.

The support 22 of the brush 16 further comprises a plurality of retention portions 38 extending from the first lateral rim 26. The retention portions 38 are identical to one another. The retention portions 38 are in this case in the form of lugs. The retention portions 38 are spaced apart from one another in the circumferential direction of the assembly 10, in this case regularly or evenly.

Each retention portion 38 includes an annular-shaped mounting part 40 extending radially inwardly from a small-diameter edge of the first lateral rim 26 and axially within the bore 42 of the mounting plate 18, more specifically within the bore 42 of the main body 30 of the mounting plate 18.

The mounting part 40 of each retention portion 38 is in radial contact against the bore 42 of the mounting plate 18. Alternatively, there may be a slight radial clearance between each retention portion 38 and the bore of the mounting plate 42. The mounting part 40 of each retention portion 38 remains radially at a distance from the shaft 6 of the electric motor 2; i.e., each mounting part 40 is spaced radially outwardly from the shaft 6.

Each retention portion 38 further includes a retention hook 44 extending radially outwardly from the mounting part 40 on a side opposite to the first lateral rim 26, such that the mounting plate 18 is disposed axially between the lateral rim 26 and the plurality of retention hooks 44. The hooks 44 are preferably formed identical to each other. The hooks 44 are located axially on the side opposite the first lateral rim 26 with respect to the mounting plate 18, more specifically on the side opposite the first lateral rim 26 with respect to the main body 30 of the mounting plate 18.

The hooks 44 of the retention portions 38 interact by axial contact with the mounting plate 18 so as to axially retain the support 22 of the brush 16 with respect to the mounting plate 18. More specifically, the hooks 44 of the retention portions 38 interact by axial contact with the main body 30 of the mounting plate 18. The hooks 44 are axially in contact against the end face 35 of the mounting plate 18. Alternatively, there may be a slight axial clearance between the hooks 44 and the end face 35 of the mounting plate 18.

In the depicted example, the support 22 of the brush 16 includes a plurality of retention portions 38 spaced apart from each other in the circumferential direction to facilitate mounting on the mounting plate 18. More specifically, the support 22 of the brush 16 has at least two retention portions 38, each retention portion 38 including a mounting part 40 extending over a limited angular sector and at least one retention hook 44.

Alternatively, the support 22 of the brush 16 may comprise a single annular retention portion 38 equipped with a singular annular hook 44 or having a plurality of hooks 44 circumferentially spaced apart from each other. Such a single retention portion 38 preferably has a mounting part 40 extending over an angular sector of at least three hundred degrees (300°), preferably over an angular sector of greater than three hundred fifty degrees (350°). In another alternative, the support 22 of the brush 16 may comprise a retention portion 38 formed as an open ring and equipped with one or more hooks 44.

In the depicted exemplary embodiment, the support 22 of the brush 16 is made of one piece construction. Alternatively, the retention portions 38 may be formed as separate parts attached to the remainder of the support 22 by any appropriate means, for example by welding or adhesive bonding.

In the example shown, the mounting plate 18 includes a plurality of centering portions 32 spaced apart regularly or evenly in the circumferential direction of the grounding brush assembly 10. In a variant, the mounting plate 18 may include a plurality of centering portions 32 spaced apart irregularly in the circumferential direction of the assembly 10. In another variant, the mounting plate 18 may comprise a single annular centering portion 32 forming as a flange.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a brush having a support and a plurality of conductive fibers disposed at least partially within the support, the support including a mounting portion, a first lateral rim extending from one axial side of the mounting portion and a second lateral rim extending from an opposing axial side of the mounting portion, the first and second lateral rims axially gripping the conductive fibers; and a brush mounting plate having a bore;

wherein the support of the brush further includes at least one retention portion extending from the first lateral rim of the support and having a mounting part extending within the bore of the mounting plate and at least one retention hook extending radially outwardly from the mounting part and interacting with the mounting plate so as to axially retain the support of the brush with respect to the mounting plate, the at least one retention hook being located axially on a side of the mounting plate opposite to the first lateral rim with respect to the mounting plate.

2. The grounding brush assembly according to claim 1, wherein the mounting plate includes a main body providing the bore of the mounting plate and at least one centering portion extending at least axially from the main body, the at least one centering portion being offset radially outwardly with respect to the support and having an outer surface defining an outside diameter of the mounting plate, the mounting part of the retention portion of the support extending within the bore of the main body of the mounting plate and the at least one hook of the at least one retention portion interacting with the main body.

3. The grounding brush assembly according to claim 1, wherein the at least one retention portion of the support of the brush extends from a small-diameter edge of the first lateral rim of the support of the brush.

4. The grounding brush assembly according to claim 1, wherein the at least one hook of the at least one retention portion interacts by axial contact with the mounting plate so as to axially retain the support of the brush with respect to the mounting plate.

5. The grounding brush assembly according to claim 1, wherein the support of the brush includes a single retention portion, the mounting part of the single retention portion extending over an angular sector of at least three hundred degrees (300°), the at least one retention hook extending from the single retention portion.

6. The grounding brush assembly according to claim 5, wherein the mounting part of the single retention portion of the support extends over an angular sector of greater than three hundred fifty degrees (350°).

7. The grounding brush assembly according to claim 1, wherein the support of the brush has at least two retention portions, each retention portion including a mounting part extending over a limited angular sector and at least one retention hook.

8. An electric motor comprising:

a casing having a bore;

a shaft; and a grounding brush assembly according to claim 1 mounted radially between the casing and the shaft, the conductive fibers of the assembly being in contact with the shaft and the mounting plate being in radial contact with the bore of the casing.

* * * * *